Aug. 9, 1955 T. C. KANE 2,714,899
SHOCK ABSORBING MEANS OR ACCUMULATOR
Filed March 2, 1951
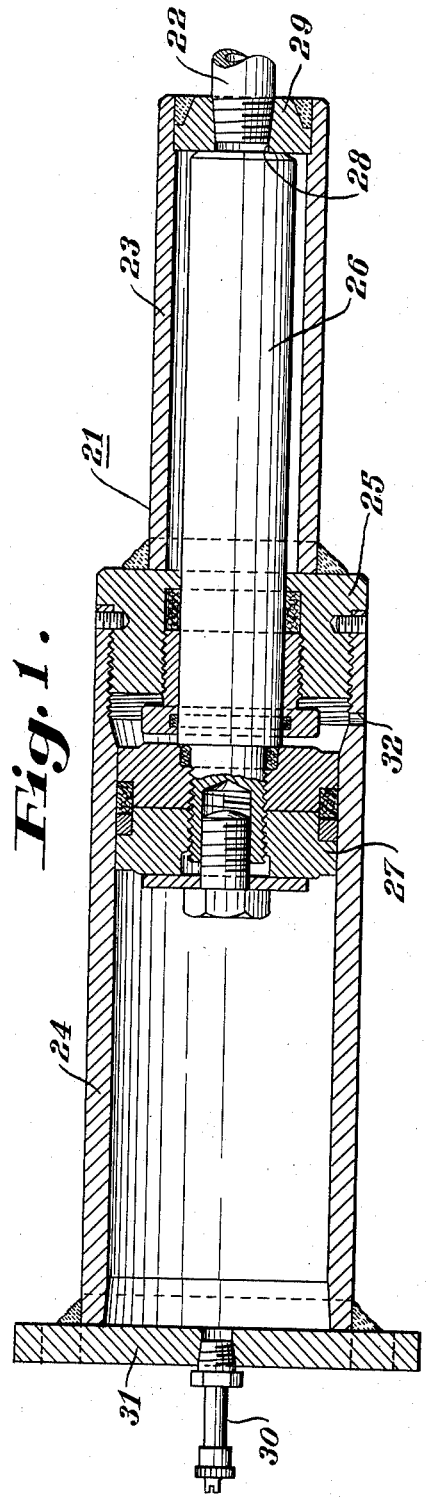
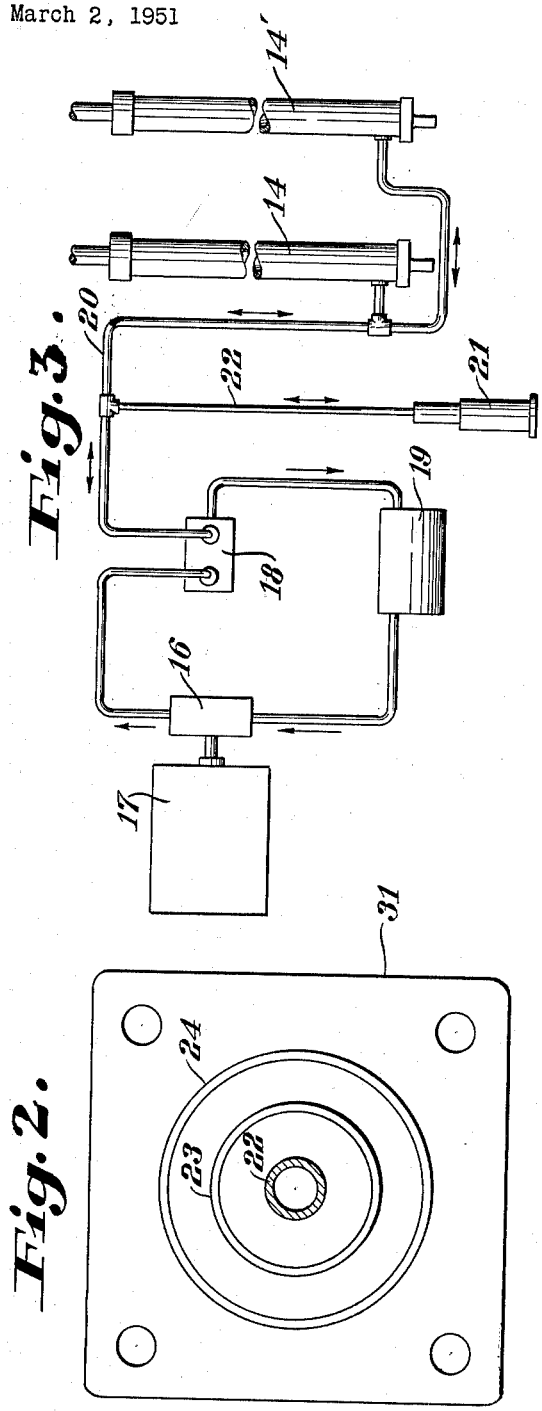
INVENTOR
Thomas C. Kane
By his attorneys
Hoopes, Leonard & Glenn

United States Patent Office 2,714,899
Patented Aug. 9, 1955

2,714,899
SHOCK ABSORBING MEANS OR ACCUMULATOR

Thomas C. Kane, Youngstown, Ohio, assignor to The Commercial Shearing & Stamping Co., Youngstown, Ohio, a corporation of Ohio Application March 2, 1951, Serial No. 213,638

2 Claims. (Cl. 138—31)

This invention relates to shock absorbing means or accumulator and more particularly to shock absorbing means for hydraulically operated equipment. The invention will be described herein in connection with an earth moving apparatus.

Hydraulically operated earth movers have an assembly of supporting members and one or more hydraulic rams for mounting and operating a bucket or the like on a tractor. The hydraulic system tends to transmit shock throughout the assembly and the severe shocks encountered in normal operations tend to break or misalign the assembly.

In accordance with my invention injuries to hydraulically operated equipment such as earth movers are greatly reduced by introducing hydro-pneumatic shock absorbing means in the hydraulic actuating system which dissipate shocks received by the system. A preferred form of these means includes a pair of coaxial cylinders, one of which is connected to the hydraulic system and the other of which contains a closed body of air, with connected displacement means in the two cylinders to transmit shocks from the hydraulic cylinder to the air cylinder, where the shocks are absorbed by compression of the air. The amount of yield to shocks and other unusual pressures is controlled by the relative sizes of the cross-sectional areas of the displacement means in the two cylinders and of the initial air pressure in the air cylinder. Moreover, the displacement means in the hydraulic cylinder has a smaller area exposed to hydraulic pressure before it yields to hydraulic pressure than after it has yielded, in order to prevent predetermined normal pressures from causing any yielding of the shock absorber.

Further novel features and advantages of the shock absorbing means or accumulator of my invention will become apparent from the following detailed description and in the accompanying drawings. I have shown in the drawings for purposes of illustration only, a present preferred embodiment of my invention, in which Figure 1 shows a sectional view of a shock absorber of this invention;

Figure 2 shows an end view of the shock absorber, taken from the right of Figure 1; and Figure 3 shows a diagram of the hydraulic system of a tractor loader incorporating the shock absorber of Figure 1.

Referring in detail to the drawings and initially to Figure 1, there is shown hydraulic system for a tractor loader having a bucket mounted on a tractor. A pair of independently operated rams are mounted on the same side of the tractor and are connected to the conventional bucket and boom of the loader to swing the boom and to tilt the bucket. A corresponding boom and pair of rams are mounted on the other side of the tractor to support the other end of the bucket. The invention herein will be described as applied to the system for operating the lifting rams to lift the boom. These rams are designated herein by the numerals 14 and 14'. As shown in Figure 3, the ram 14 and the corresponding ram 14' on the other side of the tractor are actuated by a hydraulic system comprising a pump 16 driven by the motor 17 of the tractor, a control valve 18 for selectively directing hydraulic fluid under pressure from the pump 16 to the rams 14 and 14' or to a tank 19 connected to the inlet of pump 16. A conduit 20 connects the valve 18 with the rams 14 and 14'. The apparatus thus far described is a simple illustrative form of a conventional hydraulic operating system in earth moving equipment.

A hydro-pneumatic shock absorber 21 is connected to the conduit 20 by a conduit 22. The shock absorber 21 has a cylinder 23 connected coaxially with a cylinder 24 by means of a connecting piece 25. A ram 26 extends slidably and in sealed relation through the connecting piece 25 for axial movement in the cylinders 23 and 24. A piston 27 of greater diameter than the ram 26 is secured to the ram 26 within the cylinder 24. The hydraulic fluid conduit 22 is connected to an opening 28 through a plate 29 closing the free end of the cylinder 23. The opening 28 is of less diameter than the ram 26 and the adjacent end of the ram fits tightly against the plate 29 and seals the opening 28 when pressure in the cylinder 24 on the piston 27 overcomes counterpressure of hydraulic fluid on the ram 26. Pressure on the piston 27 is supplied by compressed air pumped into the cylinder 24 through a fill-check valve 30 controlling an opening through a closure plate 29 on the free end of the cylinder 24. The space between the piston 27 and connecting piece 25 has an air relief opening 32 through the cylinder 24.

The shock absorber 21 is prepared for operation by pumping air into the cylinder 24 to a predetermined pressure which will prevent the ram 26 from yielding in response to normal operating pressures in the hydraulic system but will permit the ram 26 to yield when higher pressures in the hydraulic system develop in response to excessive loads or shocks during operation of the bucket. In this way the body of compressed air in the cylinder 24 is used to control the minimum pressure at which the shock absorber 21 becomes effective and is also used to cushion overload and shock forces in a relatively soft and yielding manner, even in the case of forces which are only slightly in excess of the predetermined minimum yielding pressure. The shock absorber 21 thereby avoids interference with normal operation of the hydraulic system but is effective in preventing or reducing damage to the parts connected to the hydraulic system when overload or shock forces are encountered.

While I have shown and described a present preferred embodiment of the invention it will be recognized that the invention is not limited thereto but may be variously embodied and practiced within the scope of the following claims.

I claim:

1. In apparatus operated by a hydraulic system, hydro-pneumatic shock absorbing means comprising a hydraulic cylinder with an opening at one end connected to said hydraulic system and a pneumatic cylinder of substantially larger diameter at the other end of the hydraulic cylinder, a fill-check valve connected to the pneumatic cylinder to fill it with compressed air, a pair of displacement means movable in the respective cylinders and a connection therebetween extending slidably in sealed relation through adjacent ends of the cylinders, the displacement means in the hydraulic cylinder having a larger cross-sectional area than said opening and having an end adapted to extend across and close said opening when the latter displacement means moves to its extreme position toward said opening.

2. In apparatus operated by a hydraulic system, hydro-pneumatic shock absorbing means comprising a hydraulic cylinder with an opening at one end connected to said hydraulic system and a pneumatic cylinder of substantially larger diameter at the other end of the hydraulic cylinder, a fill-check valve connected to the pneumatic cylinder to fill it with compressed air, a pair of displacement means movable in the respective cylinders and a connection therebetween extending slidably in sealed relation through adjacent ends of the cylinders, the displacement means in the hydraulic cylinder having a larger cross-sectional area than said opening and having an end adapted to extend across and close said opening when the latter displacement means moves to its extreme position toward said opening, said displacement means being normally held in the extreme position toward said opening whereby to expose only an area on the end thereof substantially equal to the size of the opening to the hydraulic fluid in the system.

References Cited in the file of this patent

UNITED STATES PATENTS

| | | |
|---|---|---|
| 841,791 | Lemp | Jan. 22, 1907 |
| 1,512,736 | Aldrich | Oct. 21, 1924 |
| 2,170,890 | Allen | Aug. 29, 1939 |
| 2,406,197 | Christensen | Aug. 20, 1946 |
| 2,440,065 | Ashton | Apr. 20, 1948 |